United States Patent
Sato

(10) Patent No.: US 9,246,909 B2
(45) Date of Patent: Jan. 26, 2016

(54) IMAGE AUTHENTICATION AND RETRIEVAL PROCESSING DEVICE AND METHOD

(71) Applicant: Toshimitsu Sato, Tokyo (JP)

(72) Inventor: Toshimitsu Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 41 days.

(21) Appl. No.: 13/846,336

(22) Filed: Mar. 18, 2013

(65) Prior Publication Data

US 2013/0291077 A1      Oct. 31, 2013

(30) Foreign Application Priority Data

Apr. 26, 2012   (JP) ................................ 2012-101173
Jan. 9, 2013    (JP) ................................ 2013-001454

(51) Int. Cl.
    H04L 29/06    (2006.01)
    H04L 9/32     (2006.01)
    H04L 29/08    (2006.01)
    G06F 17/30    (2006.01)

(52) U.S. Cl.
    CPC ...... *H04L 63/0823* (2013.01); *G06F 17/30899* (2013.01); *H04L 9/3263* (2013.01); *H04L 63/08* (2013.01); *H04L 63/10* (2013.01); *H04L 67/02* (2013.01)

(58) Field of Classification Search
    CPC .... H04L 63/0823; H04L 63/10; H04L 9/3263
    See application file for complete search history.

(56) References Cited

U.S. PATENT DOCUMENTS

| 8,332,627 | B1 * | 12/2012 | Matthews ........... H04L 63/0869 |
| | | | 713/155 |
| 8,544,067 | B2 * | 9/2013 | Grieve .............................. 726/4 |
| 8,572,693 | B2 * | 10/2013 | Inoue ................................ 726/3 |
| 8,621,091 | B1 * | 12/2013 | Akalin et al. .................. 709/228 |
| 8,676,978 | B2 * | 3/2014 | Jiang et al. ..................... 709/226 |
| 2004/0123154 | A1 * | 6/2004 | Lippman et al. .............. 713/201 |

(Continued)

FOREIGN PATENT DOCUMENTS

| CN | 102238172 A | 11/2011 |
| JP | 2002-297755 A | 10/2002 |

(Continued)

OTHER PUBLICATIONS

Rasal, Laxman A.; Attar, V.Z.; "Web Browser Architecture Proposal with Local Agent", International Conference on Intelligent Agent and Multi-Agent Systems, Jul. 22-24, 2009, pp. 1-5.*

*Primary Examiner* — Victor Lesniewski
(74) *Attorney, Agent, or Firm* — Birch, Stewart, Kolasch & Birch, LLP

(57) ABSTRACT

An image processing device controls a local resource, retrieves data files from a network, generates partial images from data included in the data files, and displays an image by combining the plurality of partial images. The partial images include first partial images that require access to the local resource and second partial images that do not require such access. Access to the local resource takes place by request and is controlled so that generation of the first partial images requires authentication of the retrieved data files. While authentication is in progress, the image processing device disallows access to the local resource and displays an image by combining the second partial images with a notification image indicating that authentication is being performed.

9 Claims, 12 Drawing Sheets

(56) References Cited

U.S. PATENT DOCUMENTS

| | | |
|---|---|---|
| 2005/0033994 A1* | 2/2005 | Suzuki .......................... 713/202 |
| 2005/0144134 A1 | 6/2005 | Hirano |
| 2006/0073785 A1* | 4/2006 | Klassen ............. H04W 76/005 455/3.01 |
| 2007/0220134 A1* | 9/2007 | Cameron et al. ............. 709/224 |
| 2009/0079877 A1* | 3/2009 | Tomimitsu ................... 348/708 |
| 2010/0229215 A1* | 9/2010 | Goto ................................ 726/3 |
| 2010/0250664 A1* | 9/2010 | Naka ............................... 709/203 |
| 2010/0257590 A1 | 10/2010 | Inoue |
| 2010/0299630 A1* | 11/2010 | McCutchen et al. .......... 715/803 |
| 2010/0313252 A1* | 12/2010 | Trouw ................ G06F 17/3089 726/7 |
| 2011/0261386 A1 | 10/2011 | Kasuya |
| 2011/0321133 A1 | 12/2011 | Grieve |
| 2012/0036264 A1* | 2/2012 | Jiang et al. .................... 709/226 |
| 2013/0054968 A1* | 2/2013 | Gupta ............................ 713/168 |
| 2013/0212465 A1* | 8/2013 | Kovatch ........................ 715/234 |
| 2013/0238742 A1* | 9/2013 | Kay et al. ...................... 709/213 |
| 2014/0282862 A1* | 9/2014 | Persson et al. .................... 726/1 |

FOREIGN PATENT DOCUMENTS

| | | |
|---|---|---|
| JP | 2005-190440 A | 7/2005 |
| JP | 2008-62440 A | 3/2008 |
| JP | 2009-16909 A | 1/2009 |
| JP | 2009-33355 A | 2/2009 |
| JP | 2010-257289 A | 11/2010 |
| WO | WO 2012164385 A3 * | 2/2013 |

* cited by examiner

FIG. 5

```
1:  <!DOCTYPE html>
2:  <html>
3:  <head>
4:  <title>WATCH ON THE NET</title>
5:  <script type="text/javascript" src="common.js"></script>
6:  <link rel="stylesheet" type="text/css" href="default.css" />
7:  </head>
8:  <body>
9:  <h2>WATCH ON THE NET</h2>
10: <h3>MENU</h3>
11: <div id="time01">TIME:</div>
12: <ul class="menu">
13: <li><a href="01.html"><img src="btn_01.jpg" width="100" height="30" alt="NEW RELEASE"></a></li>
14: <li><a href="02.html"><img src="btn_02.jpg" width="100" height="30" alt="DRAMA"></a></li>
15: <li><a href="03.html"><img src="btn_03.jpg" width="100" height="30" alt="MOVIE"></a></li>
16: <li><a href="04.html"><img src="btn_04.jpg" width="100" height="30" alt="ANIMATED CARTOON"></a></li>
17: <li><a href="05.html"><img src="btn_05.jpg" width="100" height="30" alt="VARIETY SHOW"></a></li>
18: </ul>
19: <div class="image01"><img src="image01.jpg" width="300" height="225" alt="NEW RELEASE INFORMATION"></div>
20: <div id="form01">
21: <form method="POST" action="cgi-bin/form01.cgi" id="f1">
22: COMMENT : <input type="text" name="f1field1" />
23: <input type="button" value="SAVE" onclick="setStr()" />
24: <input type="button" value="DISPLAY" onclick="getStr()" />
25: <input type="button" value="DELETE" onclick="clearStr()" />
26: <input type="submit" value="SEND" />
27: </form>
28: </div>
29: </body>
30: </html>
```

FIG. 6

```
1:  #time01 {
2:      position: absolute;
3:      top: 20px;
4:      left: 300px;
5:  }
6:
7:  ul.menu {
8:      position: absolute;
9:      top: 100px;
10: }
11:
12: .image01 {
13:     position: absolute;
14:     top: 50px;
15:     left: 200px;
16:     border-style: solid;
17: }
18:
19: #form01 {
20:     position: absolute;
21:     top: 300px;
22:     left: 20px;
23: }
```

FIG. 7

```
1:  window.onload = function(){
2:    var date = new Date();
3:    var textNode = document.createTextNode(date.toLocaleString());
4:    var info = document.getElementById('time01');
5:    info.appendChild(textNode);
6:  }
7:
8:  function setStr(){
9:    var str = document.f1.f1field1.value;
10:   localStorage.setItem('comment', str);
11: }
12:
13: function getStr(){
14:   var str = localStorage.getItem('comment');
15:   if(str != null){
16:     alert(str);
17:   }
18: }
19:
20: function clearStr(){
21:   localStorage.removeItem('comment');
22: }
```

IMAGE AUTHENTICATION AND RETRIEVAL PROCESSING DEVICE AND METHOD

BACKGROUND OF THE INVENTION

1. Field of the Invention

This invention relates to an image processing device and an image processing method.

2. Description of the Related Art

Many recent personal computers, television sets, mobile communication devices, and other electronic devices have functions for presenting graphical information to the user. One means of presenting graphical information is a web browser. A web browser retrieves a web page from a server (site) on the Internet or an intranet, generates image information based on the web page, and displays the corresponding image on a screen, enabling the user to browse the web page. The web page consists of one or more data files including information written in a markup language, style sheet language, script language, etc. established by a standardization organization such as the World Wide Web Consortium (W3C). The web page can be retrieved by specifying a URI (Uniform Resource Identifier) that indicates the location at which the web page resides on the Internet or an intranet.

To make web browsers easier to use, new techniques, such as hypertext transfer markup language (HTML) 5 and other techniques, have been proposed. HTML5 allows a web browser to store the content of web pages in the image processing device on which the web browser is running and read the stored content later. Browser functions are also being expanded to enable the browser to access local hardware resources such as a Global Positioning System (GPS) receiver in a mobile communication device.

To protect the security of stored content, the communication apparatus described by Shioda in Japanese Patent Application Publication No. 2010-257289, for example, encrypts the stored content, and decrypts the encrypted stored content and supplies it to the browser only if authentication succeeds. More specifically, the communication apparatus enables a browser to use previously received data offline. The data are stored in an encrypted form. When the stored data are used, user authentication is performed. If authentication succeeds, the data are decrypted and made available for use.

A problem with this system is that until the authentication process is completed the browser does not receive any data and cannot display anything on the screen.

SUMMARY OF THE INVENTION

An object of the present invention is to enable an image based on retrieved data to be displayed before data authentication is completed, without compromising the security of hardware resources.

The invention provides an image processing device including a retrieval section, an authentication unit, a local resource, a resource access control unit, a resource access supervision section, and a display image generating unit. The retrieval section retrieves a data file from a network. The data file includes data for generating a plurality of partial images. The partial images include one or more first partial images requiring access to the local resource and one or more second partial images not requiring access to the local resource. The authentication unit authenticates the data file. The resource access control unit controls the local resource. The resource access supervision section receives authentication results from the authentication unit and decides whether to allow access to the local resource. The display image generating unit makes access requests to the resource access supervision section for access to the local resource, generates the plurality of partial images, and generates a display image by combining the partial images.

While the authentication unit is performing authentication, the resource access supervision section disallows access to the local resource and sends the display image generating unit an authentication-in-progress notification. Upon receiving this notification, the display image generating unit generates a notification image indicating that authentication is being performed, and generates the display image by combining the second partial images and the notification image.

When authentication succeeds, the display image generating unit may access the local resource and generate the display image by combining the first and second partial images.

In one aspect, the invention enables an image based on retrieved data to be displayed before authentication of the retrieved data is completed, without compromising the security of hardware resources.

BRIEF DESCRIPTION OF THE DRAWINGS

In the attached drawings:

FIG. 5 schematically shows an example of the content of an HTML file of a web page in the embodiment;

FIG. 6 schematically shows an example of the content of a style sheet file in the embodiment;

FIG. 7 schematically shows an example of the content of a script file in the embodiment;

DETAILED DESCRIPTION OF THE INVENTION

Figure 1:
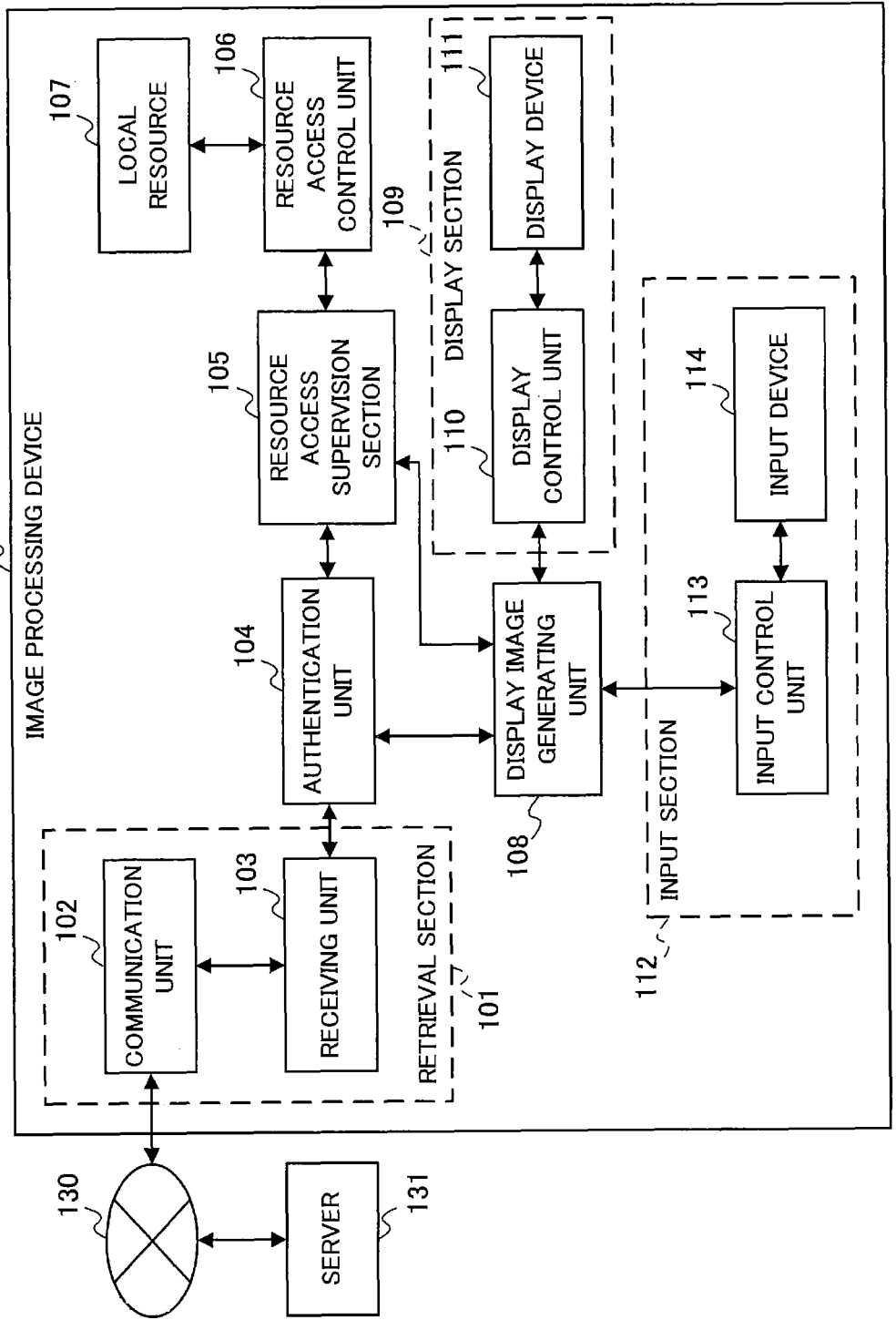
FIG. 1 is a block diagram schematically showing the structure of an image processing device according to an embodiment of the invention.

An image processing device embodying the invention will now be described with reference to the attached drawings, in which like elements are indicated by like reference characters.

Referring to FIG. 1, the image processing device 100 includes a retrieval section 101, an authentication unit 104, a resource access supervision section 105, a resource access control unit 106, a local resource 107, a display image generating unit 108, a display section 109, and an input section 112. The retrieval section 101 includes a communication unit 102 and a receiving unit 103. The display section 109 includes a display control unit 110 and a display device 111. The input section 112 includes an input control unit 113 and an input device 114.

The image processing device 100 is configured for communication with a server 131 over a network 130. The network 130 is, for example, a wide-area network such as the Internet or a smaller-scale network such as a local area network (LAN).

The retrieval section 101 sends and retrieves data over the network 130.

The communication unit 102 carries out communication with the network 130. For example, the communication unit 102 communicates with the server 131 according to a communication protocol such as a hypertext transfer protocol (HTTP), and sends a 'get' request to the server 131 to retrieve a web page specified by address information. The address information uniquely specifies the location of the web page resource. A URI can be used as the address information. The web page consists of one or more data files written in a markup language such as the hypertext transfer markup language (HTML), extensible hypertext markup language (XHTML), or extensible markup language (XML). The web page may include a style sheet file written in a style sheet language for controlling the display format of display elements included in the data file, and a script file written in a script language for producing dynamic expression on the web page when it is displayed at an image processing device. Cascading Style Sheet (CSS) is one example of a style sheet language. Java Script is one example of a script language. The data file or files constituting the web page include data for generating a plurality of partial images and generating the display image by combining the plurality of partial images.

The receiving unit 103 requests data from the server 131 through the communication unit 102, retrieves the requested data, and supplies the retrieved data to the authentication unit 104.

The authentication unit 104 performs processing to authenticate the data received from the receiving unit 103 and notifies the resource access supervision section 105 of the authentication result. Of the data received from the receiving unit 103, the authentication unit 104 passes HTML file data and data referred to in the HTML file data, such as style sheet and script file data, to the display image generating unit 108.

The purpose of authentication is to prevent server spoofing and protect personal information and confidential information such as password and credit card information from eavesdropping and tampering. For this purpose, when such data are exchanged on the web, a communication protocol known as Secure Socket Layer (SSL) is used. This communication protocol is standardized as Transport Layer Security (TLS).

SSL authentication methods often use a public key infrastructure (PKI). A PKI system uses a private key possessed exclusively by the signatory of a digital signature and a public key paired with the private key and made available to other parties. Data encrypted with the private key can be decrypted with the paired public key; data encrypted with the public key can be decrypted with the paired private key.

In authentication using a digital signature, the signatory party applies a hash algorithm to the digital data to be authenticated to generate a hashed form of the digital data known as a digest, generates encrypted data by using the private key to encrypt the digest, and transmits both the digital data and the encrypted data. The encrypted data is the digital signature. A party receiving the digital data and encrypted data uses the public key to decrypt the encrypted data, and compares the decrypted data with a digest generated by applying the same hash algorithm to the received digital data. If the two digests match, that proves that the received digital data have not been tampered with and that the encrypted data was encrypted by the signatory party, who is the only party in possession of the private key. The received digital data are thereby authenticated. If the decrypted digest and the digest generated by applying the hash algorithm to the received digital data do not match, or if the encrypted data cannot be decrypted, that shows that the received data have been tampered with or that a different party's key was used to encrypt the digest; in either case, the received data are not authenticated.

For higher reliability, the signatory's public key may be provided to the receiving party in a digital certificate. The digital certificate is issued by a certificate authority (CA), and includes such information as the signatory's name and public key, the period of validity, the name of the CA, and the digital signature of the CA. The CA certifies the information in the digital certificate; the CA's digital signature certifies that the digital certificate is valid and was issued by the CA.

The server 131 generates web page data and authentication data by using the PKI described above. The authentication unit 104 in the image processing device 100 receives both types of data from the server 131, uses the authentication data to authenticate the web page data, and notifies the resource access supervision section 105 of the authentication result.

Figure 2:
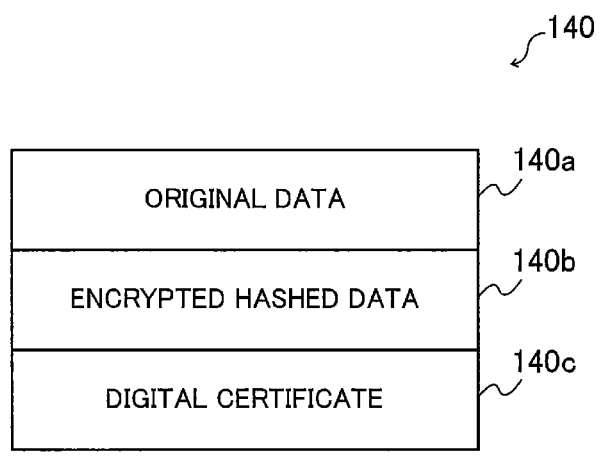
FIG. 2 schematically shows an example of the structure of authentication data using a public key infrastructure.

Referring to FIG. 2, data 140 retrieved from the server 131 by the image processing device 100 include original data 140a, which are non-encrypted web page data, encrypted hashed data 140b generated by using the private key of the server 131 to encrypt a digest generated by applying a hash function to the original data 140a, and a digital certificate 140c certifying the server 131.

Figure 3:
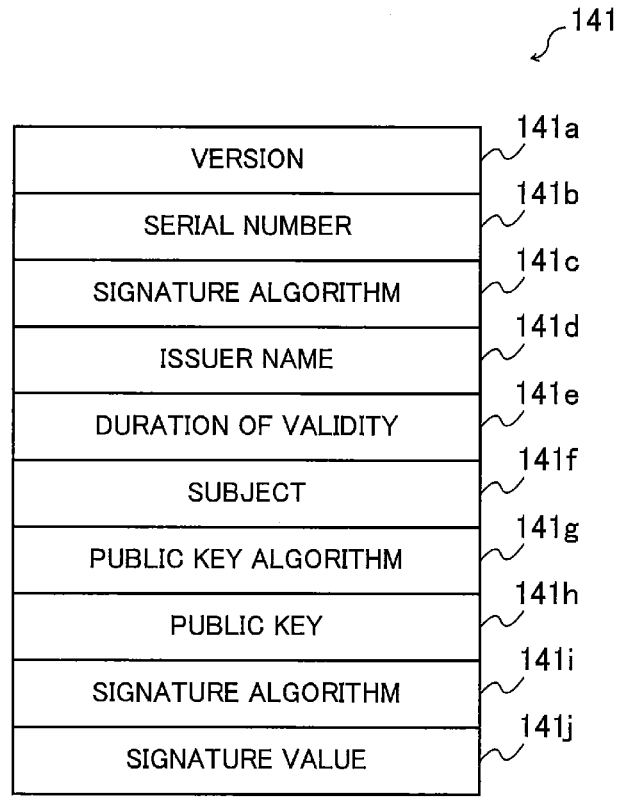
FIG. 3 schematically shows an example of the structure of a digital certificate used in the embodiment.

Referring to FIG. 3, a digital certificate 141 includes the version 141a of the digital certificate 141, a serial number 141b identifying the digital certificate 141, information denoting the signature algorithms 141c and 141i used by the CA in 'signing' the certificate, an issuer name 141d indicating the name of the CA, the duration of validity 141e of the digital certificate 141, the name of the subject 141f of the digital certificate 141, the public key algorithm 141g and public key 141h of the subject 141f, and the CA's signature value 141j certifying the digital certificate 141. The signature algorithm field 141c may include, for example, values indicating that Rivest Shamir Adleman (RSA) encryption is used as the public-key cryptosystem, Secure Hash Algorithm One (SHA-1) is used as the hash function, and RSA encryption is used as the public-key algorithm. The authentication data described above are used to authenticate the web page data.

Figure 4:
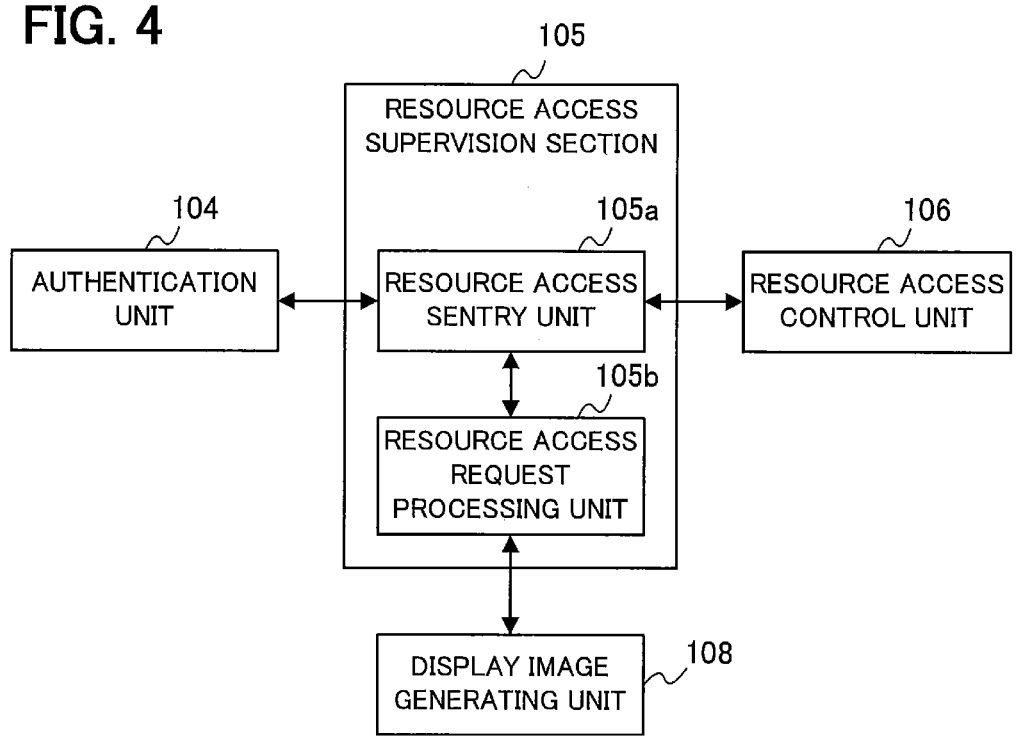
FIG. 4 schematically shows an example of the structure of the resource access supervision section in the embodiment.

Returning to FIG. 1, the resource access supervision section 105 monitors access to the local resource 107 in the image processing device 100, receives authentication results and status information from the authentication unit 104, and decides whether to allow access to the local resource 107. Referring to FIG. 4, the resource access supervision section 105 includes a resource access sentry unit 105a and a resource access request processing unit 105b.

The resource access sentry unit 105a receives authentication results and status information from the authentication unit 104, and decides whether to allow access to the local resource 107. For example, when authentication succeeds in the authentication unit 104, the resource access sentry unit 105a allows access to the local resource 107; when authentication fails in the authentication unit 104, the resource access sentry unit 105a disallows access to the local resource 107. The resource access sentry unit 105a also disallows access to the local resource 107 while the authentication unit 104 is performing authentication.

The resource access sentry unit 105*a* also receives access requests from the display image generating unit 108, and confirms and monitors library and driver access for access to the local resource 107. Access to the local resource occurs in the web page configured in FIGS. 5, 6, and 7, for example, when the local storage interface is used to access a recording medium in the image processing device 100 on lines 10, 14, and 21 in the script file in FIG. 7. The resource access supervision section 105 monitors the library invoked by the local storage interface to control access to the recording medium, and controls access to the recording medium on the basis of authentication results and status information received from the authentication unit 104. Access to the recording medium can thereby be disallowed while authentication is in progress or when authentication fails. Other local resources in the image processing device 100 can also be similarly monitored, and access to the local resource can be restricted while authentication is in progress or when authentication fails.

The resource access request processing unit 105*b* receives access requests from the display image generating unit 108 for access to the local resource 107 and processes them according to the decisions made by the resource access sentry unit 105*a*. For example, when the resource access sentry unit 105*a* allows access to the local resource 107, the resource access request processing unit 105*b* sends a received access request to the resource access control unit 106 through the resource access sentry unit 105*a*. When the resource access sentry unit 105*a* disallows access to the local resource 107 because authentication has failed, the resource access request processing unit 105*b* sends the display image generating unit 108 an authentication failure notification. When the resource access sentry unit 105*a* disallows access to the local resource 107 because authentication is in progress, the resource access sentry unit 105*a* sends the display image generating unit 108 an authentication-in-progress notification.

Returning to FIG. 1, the resource access control unit 106 receives access requests from the resource access supervision section 105, controls the local resource 107, thereby obtains access results, and passes the access results to the resource access supervision section 105. If an access request is a request for data from the local resource 107, for example, the resource access control unit 106 gets the requested data from the local resource 107 and supplies the data to the resource access supervision section 105.

The local resource 107 is a hardware resource with which the image processing device 100 is equipped. For example, the local resource 107 may be a recording medium such as a hard disk or a memory card, a sensor for infrared ray, GPS, or the like. In the embodiment, a hardware resource as the local resource 107 is a subject to access control.

The display image generating unit 108 generates a plurality of partial images and generates the display image by combining the partial images, according to data received from the authentication unit 104 such as HTML file, style sheet, and script file data. If the data received from the authentication unit 104 include indications of access to the local resource 107 and generating the display image by using the access result, the display image generating unit 108 makes an access request to the resource access supervision section 105 for access to the local resource 107, and generates the display image according to the response to the access request from the resource access supervision section 105.

Exemplary data received from the authentication unit 104 and a display image generated from the data will be described with reference to FIGS. 5 to 8.

FIG. 5 shows an exemplary HTML file representing a web page. An HTML file is a structured text-format data file specifying a logical data structure by using tag elements enclosed in angle brackets (<>). The line numbers and colons at the left ends of the rows in FIGS. 5, 6, and 7 are shown for convenience and are not actually included in the files.

In FIG. 5, a reference to the style sheet file shown in FIG. 6 is specified by the <link> tag, which is the part between <head> and </head> tags indicating the HTML file header. The style sheet file is referenced by the "href" attribute in the <link> tag. The style sheet file is a text-format file defining the display format, such as the positions of elements specified in the HTML file in FIG. 5.

A reference to the script file shown in FIG. 7 is specified in FIG. 5 by the <script> tag enclosed between the <head> and </head> tags indicating the HTML file header. The script file is referenced by the "src" attribute in the <script> tag. A script file is a text-format file written as a program for producing dynamic expression on an image processing device.

Figure 8:
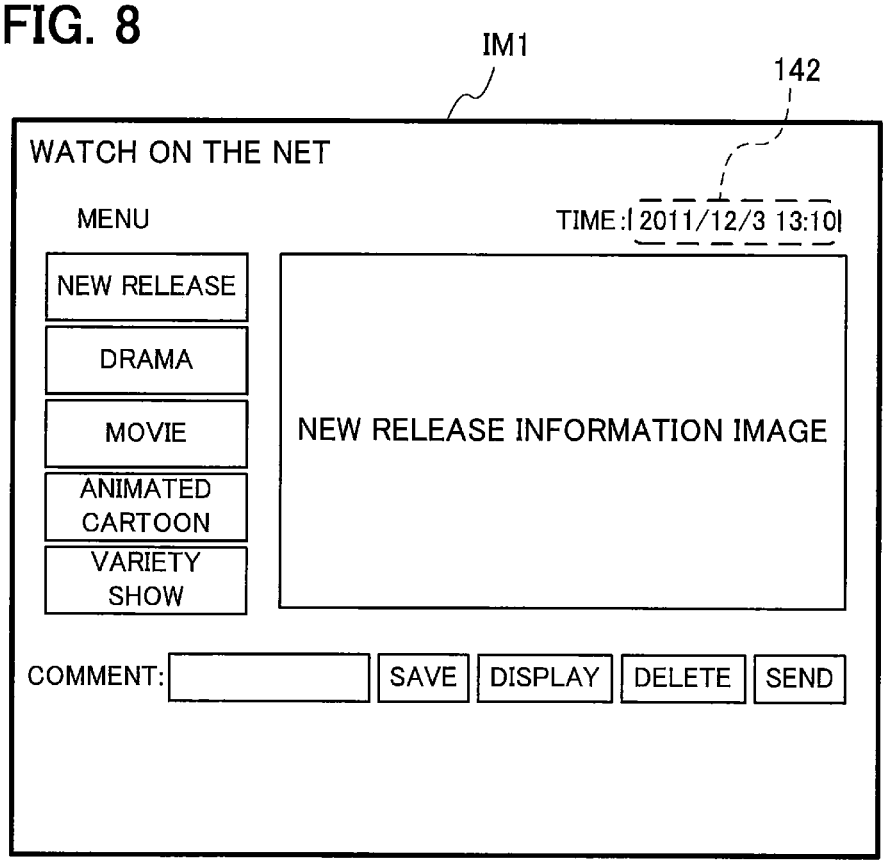
FIG. 8 schematically shows a first example of a screen generated by the display image generating unit in the embodiment.

FIG. 8 shows an exemplary display image IM1 generated by the display image generating unit 108 using the files in FIGS. 5, 6, and 7.

First, the HTML file shown in FIG. 5 will be described.

The part enclosed between the <body> tag in line 8 and the </body> tag in line 29 specifies the structure of the display content. The part enclosed between the <h2> and </h2> tags in line 9 specifies a title. The character string "WATCH ON THE NET" is displayed in the display image IM1 shown in FIG. 8 as the title. The part enclosed between the <h3> and </h3> tags in line 10 specifies the title of a menu, and the character string "MENU" is displayed in the display image IM1 shown in FIG. 8 as the title.

The part enclosed between the <div> and </div> tags in line 11 specifies a single block. Giving the <div> tag the "id" attribute and the value "time01", it is possible to set a display format in a style sheet or to perform a script operation by using the value "time01."

The part enclosed between the <ul> tag in line 12 and the </ul> tag in line 18 specifies display content configured as a list. The "class" attribute and "menu" value are added to the <ul> tag. The "class" attribute can be added to a plurality of tags. A uniform display format for tags having the same "class" attribute can be specified in the style sheet.

The part enclosed between the <li> and </li> tags in each of lines 13 to 17 specifies information about a single item in the list. In the exemplary image IM1 shown in FIG. 8, five items are displayed: "NEW RELEASE", "DRAMA", "MOVIE", "ANIMATED CARTOON", and "VARIETY SHOW". Each <li> tag includes two elements: an anchor element enclosed between <a> and </a> tags, and an element specifying an image file in an <img> tag. Each <a> tag has an "href" attribute. For the first item in the list, for example, the value of the "href" attribute is "01.html", so this anchor is referenced as a link to "01.html". The <img> tag includes "src", "width", "height", and "alt" attributes. The "src" value specifies the image file to be referenced, the "width" and "height" values specify the displayed size of the image file, and the "alt" value specifies a character string that will be displayed when the browser cannot display the image file. For the first item, for example, the image file "btn_01.jpg" is specified in the <img> tag element in line 13. The browser displays this image file as an image 100 pixels wide and 30 pixels high if possible, and displays the character string "NEW RELEASE" if it cannot display the image file.

The part enclosed between the <div> and </div> tags in line 19 specifies a single block. This part has a "class" attribute with the value "image01", and an image element in which the image file "image01.jpg" is specified in an <img> tag, with a display size 300 pixels wide and 225 pixels high.

The character string "NEW RELEASE INFORMATION" is also specified, in case the image cannot be displayed.

The part enclosed between the <div> tag in line 20 and </div> tag in line 28 specifies a single block. The <div> tag has the "id" attribute with the value "form01". The part enclosed between the <form> tag in line 21 and the </form> tag in line 27 is specified for input of data and transmission of the data to the server. The "POST" value of the "method" attribute in the <form> tag specifies that the data are to be transmitted to the server by use of the HTTP POST method. The "cgi-bin/form01.cgi" value of the "action" attribute in the <form> tag specifies that when transmitted, the data will be transmitted to the web page specified by the "action" attribute. The "f1" value of the "id" attribute in the <form> tag can be used to set a display format in a style sheet or, as will be seen in FIG. 7, to perform a script operation.

The <form> tag in line 21 includes the character string element "COMMENT:" and five <input> tag elements. The first <input> tag (line 22) has "type" and "name" attributes. The "text" value of the "type" attribute specifies a one-line text entry field. The "fifield" value of the "name" attribute specifies that the <input> element can be referenced by the "flfield" name. The second <input> tag (line 23) has "type", "value", and "onclick" attributes. The "button" value of the "type" attribute specifies an input field with a button. The "SAVE" value of the "value" attribute specifies that the character string "SAVE" is to be displayed on the button. The "onclick" attribute indicates that an action will be taken when the button is pressed by, for example, clicking on it with a mouse. The "setStr( )" value of the "onclick" attribute specifies that the "setStr( )" function specified in the script file will be executed. The third and fourth <input> tags (lines 24 and 25) use attributes to specify similar button displays and actions. The fifth <input> tag (line 26) has "type" and "value" attributes. The "submit" value of the "type" attribute specifies an input field with a button. The "SEND" value of the "value" attribute specifies that the character string "SEND" is displayed on the button. When the button with the "submit" value of the "type" attribute is pressed, a value input into the field specified by the "text" attribute is transmitted to the web page specified by the "action" attribute by use of the "POST" method, as specified by the "method" attribute in the <form> tag.

Next, the style sheet file shown in FIG. 6 will be described.

The style sheet file shown in FIG. 6 is referenced from the HTML file shown in FIG. 5, and specifies the display format.

The information in lines 1 to 5 specifies a display position corresponding to a tag having an "id" attribute with the value "time01". The value "time01" is specified in the "id" attribute in the <div> tag in line 11 in the HTML file, so this information specifies the display position for the element "time01". The information "position: absolute;" in line 2 tells the browser to interpret the position as an absolute position. The information "top: 20 px;" in line 3 and "left: 300 px" in line 4 tells the browser to position the upper-left corner dot of the dot pattern of the display element "time01" specified in the <div> tag in the HTML file at a position 20 pixels from the top and 300 pixels from the left edge of the web page.

The information in lines 7 to 10 specifies a display position corresponding to a <ul> tag having a "class" attribute with the value "menu". The information "position: absolute;" in line 8 tells the browser to interpret the position as an absolute position. The information "top: 100 px;" in line 9 tells the browser to position the top of the dot pattern of the display element "menu" specified in the <ul> tag in line 12 in the HTML file at a position 100 pixels from the top of the web page. The position from the left is not specified in the style sheet in FIG. 6, so the browser selects it automatically.

The information in line 12 to line 17 specifies a display position corresponding to a tag having a "class" attribute with the value "image01". The "class" attribute with the value "image01" is specified in the <div> tag in line 19 in the HTML file in FIG. 5. The information "position: absolute;" in line 13 tells the browser to interpret the position as an absolute position. The information "top: 50 px;" in line 14 and "left: 200 px" in line 15 tells the browser to position the upper-left corner dot of the dot pattern of the display element "image01" specified in the <div> tag in the HTML file at a position 50 pixels from the top and 200 pixels from the left edge of the web page. The information "border-style: solid;" in line 16 tells the browser to draw a solid line around the displayed element.

The information in lines 19 to 23 specifies a display position corresponding to a tag having an "id" attribute with the value "form01". The value "form01" is specified in the "id" attribute in the <div> tag in line 20 in the HTML file in FIG. 5, so this information specifies the display position of the element "form01". The information "position: absolute;" in line 20 tells the browser to interpret the position as an absolute position. The information "top: 300 px;" in line 21 and "left: 20 px" in line 22 tells the browser to position the upper-left corner dot of the dot pattern of the display element "form01" specified in the <div> tag in the HTML file at a position 300 pixels from the top and 20 pixels from the left edge of the web page. The display format of each element given in the HTML file having been specified by the information in the HTML file and the style sheet file as described above, on the basis of the specified display format, the display image generating unit 108 generates the display image IM1 shown in FIG. 8.

Next, the script file shown in FIG. 7 will be described.

A script file is a file containing a script executed by a browser at the image processing device on which the browser runs.

The function defined in lines 1 to 6 is executed when web-page retrieval is completed. In line 2, the current date and time are obtained and stored in the "date" variable. Line 3 converts the "date" variable to a displayable character string, thereby generating a text node, and stores the text node in the "textNode" variable. In line 4, an element having an "id" attribute with the value "time01" is retrieved and stored in the "info" variable. In line 5, the "textNode" variable is appended to the element displayed by the "info" variable. A dynamic retrieval time is thereby obtained and displayed on the screen: for example, as shown in the area enclosed by the dashed line 142 in FIG. 8.

A "setStr( )" function is defined in lines 8 to 11. When executed, this function gets the value specified by an element having a "name" attribute with the value "flfield1" in an element having an "id" attribute with the value "f1" and stores it in an "str" variable, as specified in line 9. Specifically, it gets the value of the character string entered in the text-entry field specified by the <input> tag in line 22 in the HTML file shown in FIG. 5. In line 10, the "str" variable is written in the "COMMENT" key by use of the local storage interface. The local storage interface is an interface for access to a specific directory and file on a recording medium such as a hard disk accessible at the image processing device, in a database format specified by the browser.

Figure 9:
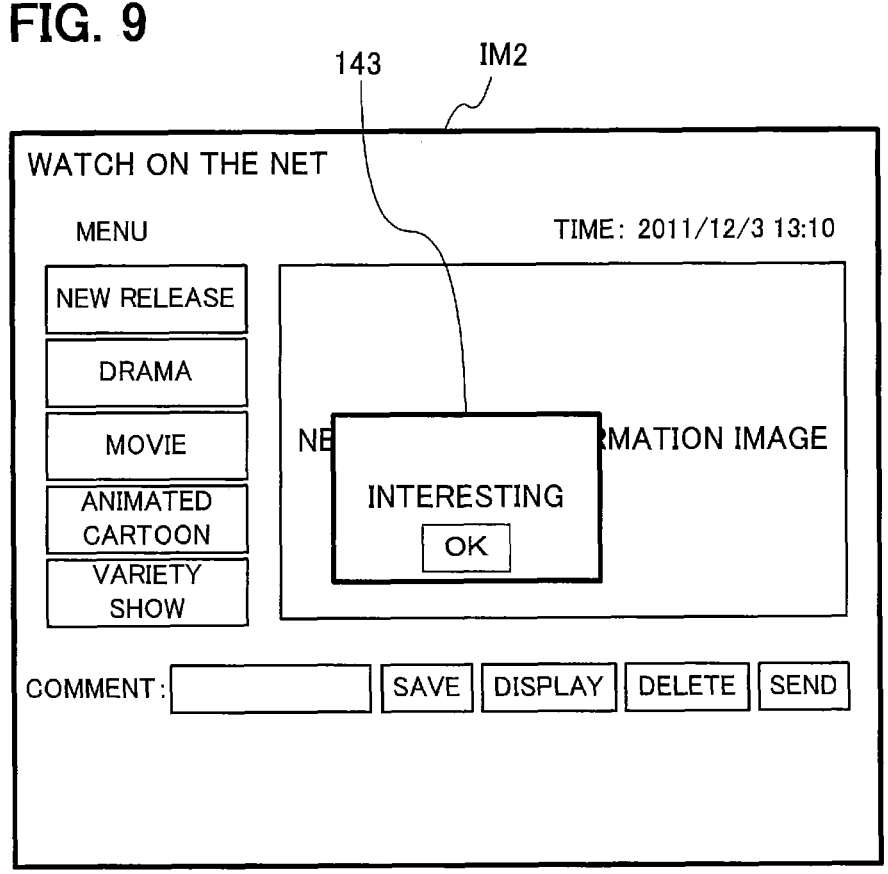
FIG. 9 schematically shows a second example of a screen generated by the display image generating unit in the embodiment.

A "getStr( )" function is defined in lines 13 to 18. When executed, this function gets the "COMMENT" key value through the local storage interface and stores it in the "str" variable in line 14. If a value is stored in the "str" variable, for example, and if the character string "INTERESTING" is stored in the "COMMENT" key, a dialog box 143 is displayed as in the image IM2 shown in FIG. 9. Although character strings are stored and displayed on the exemplary web page configured in FIGS. 5, 6, and 7, image data or other data may be stored and displayed instead of character strings.

A "clearStr( )" function is defined in lines 20 to 22. When executed, this function deletes the "COMMENT" key value from the database specified by the local storage interface of the image processing device, as specified in line 21.

The "setStr( )", "getStr( )", and "clearStr( )" functions shown in FIG. 7 are specified as values of "onclick" attributes in the <input> tags in lines 23, 24, and 25 in the HTML file in FIG. 5. Each of the <input> tags specifies an input field with a button, so when the "SAVE", "DISPLAY", or "DELETE" button is pressed on the screen in FIG. 8, the corresponding function is executed at the image processing device.

As described above, the HTML file of a web page is a structured data file specifying a logical data structure by use of tag elements. The display image generating unit 108 analyzes the data received from the authentication unit 104, generates display images corresponding to the individual tag elements, and assembles them into an image for display on the screen, using display format information such as display positions and sizes specified for the individual tags. When a tag includes an element that requires access to the local resource 107, the display image corresponding to that element cannot be generated while authentication is in progress, because access control is disallowed until authentication succeeds, but the display image generating unit 108 can still generate a display image by using the tag elements that do not require access to the local resource 107. In other words, when the display image is generated by combining first partial images that require access to the local resource 107 and second partial images that do not require such access, even during the authentication process, the display image generating unit 108 can display an image by combining the second partial images without using the first partial images. The display image generating unit 108 can also add a notification image indicating that authentication is being performed, since this notification image does not require access to the local resource 107.

For example, on the exemplary web page configured in FIGS. 5, 6, and 7, the script functions specified in the "onclick" attributes of the <input> elements in lines 23, 24, and 25 in the <form> tag in FIG. 5 include processing for making an access request to control access to the local resource 107 through the local storage interface. Because an "onclick" element is executed when a user enters data by clicking a mouse button or performing an equivalent input operation, as long as the user does not enter any such data, no access request for access to the local resource 107 is made. Accordingly, even before the authentication unit 104 has completed authentication, if no access request for access to the local resource 107 is made, the display image generating unit 108 need not wait until authentication is completed, but can generate the display image IM1 shown in FIG. 8, and can display the display image IM1 to the user on the display device 111. If the user enters an instruction for execution into the input device 114 by clicking a button displayed on the display image IM1 shown in FIG. 8 while authentication is still in progress, the display image generating unit 108 can continue to display the image IM1 shown in FIG. 8, without generating the image with the dialog box 143 shown in FIG. 9.

Returning to FIG. 1, when data require access to the local resource 107, as do the data shown in FIGS. 5 to 7, the display image generating unit 108 makes an access request to the resource access supervision section 105.

When authentication succeeds in the authentication unit 104, the resource access supervision section 105 allows the request for access to the local resource 107, and the display image generating unit 108 receives the resulting data from the resource access supervision section 105. The display image generating unit 108 then generates a display image of the web page on the basis of both the data received from the local resource 107 and the data retrieved from the web page itself.

If authentication fails in the authentication unit 104, the resource access supervision section 105 sends the display image generating unit 108 an authentication failure notification and the display image generating unit 108 generates a display image indicating that authentication has failed and the retrieved web page cannot be displayed.

While the authentication unit 104 is performing authentication, the resource access supervision section 105 sends the display image generating unit 108 an authentication-in-progress notification, and the display image generating unit 108 generates a display image including a notification image indicating that authentication for the retrieved web page is in progress and access to a requested local resource is restricted. The display image generating unit 108 passes the generated display image to the display control unit 110.

The display image generating unit 108 also receives data corresponding to user input operations from the input control unit 113, and generates a display image corresponding to the received data. For example, when the user enters text data, the display image generating unit 108 receives the entered text data, and generates a display image corresponding to the entered data. In addition, the display image generating unit 108 receives cursor position information corresponding to movement of the mouse, and generates display images such that the cursor moves on the screen as the mouse moves.

The display section 109 displays the display image received from the display image generating unit 108.

The display control unit 110 controls processing for displaying the display image received from the display image generating unit 108 on the display device 111.

The display device 111 displays the display image. A liquid crystal display or a plasma display, for example, can be used as the display device 111.

The input section 112 receives input from user operations.

The input control unit 113 receives information about user input operations from the input device 114, analyzes the information, and passes resulting data to the display image generating unit 108.

The input device 114 receives input provided by user operations. A key input device such as a keyboard or a remote control, or a pointing device such as a mouse or a touch panel, for example, can be used as the input device 114.

Figure 10:
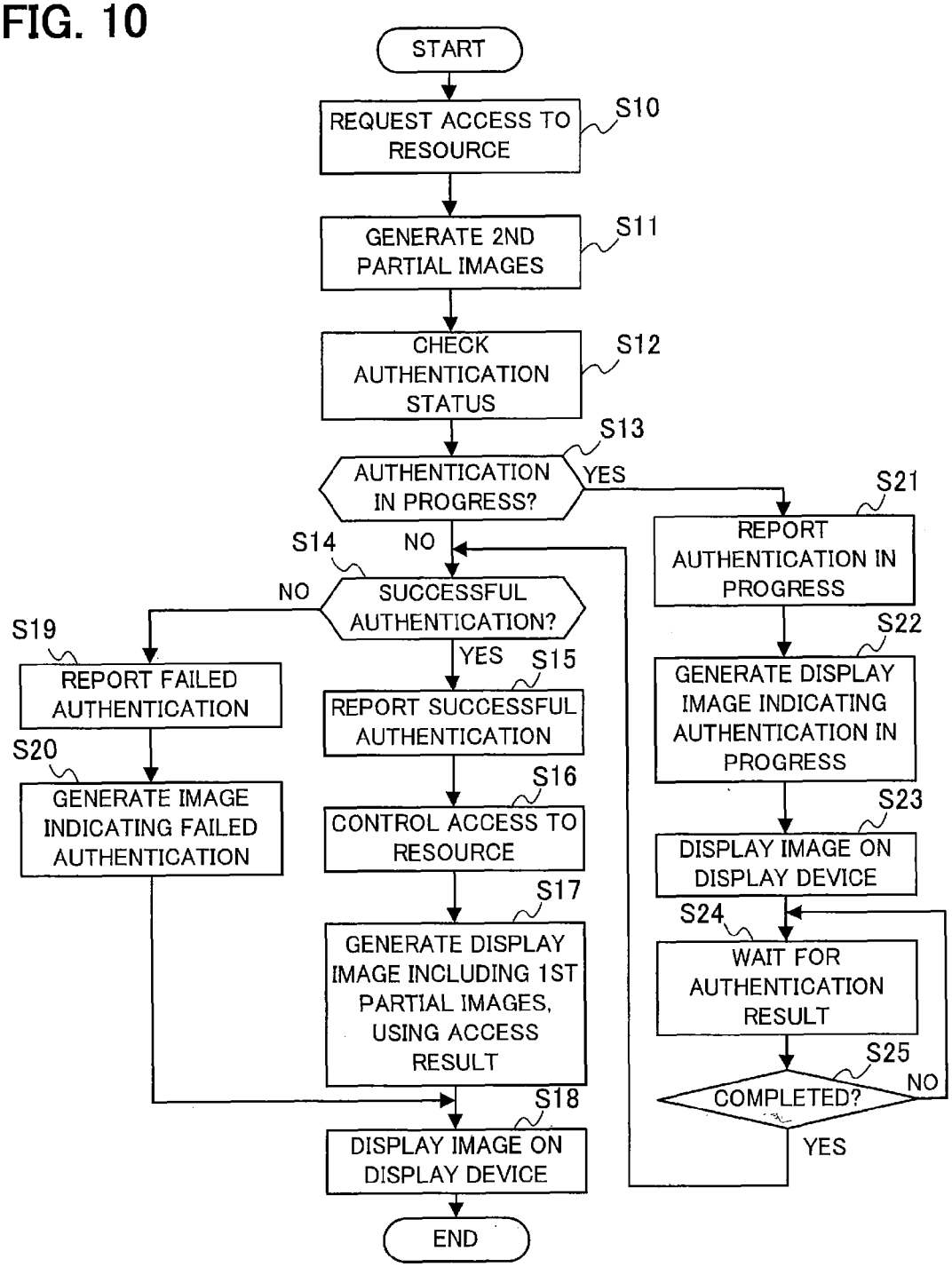
FIG. 10 is a flowchart illustrating processing when the display image generating unit requests access to a local resource and generates a screen display in the embodiment.

The process of generating an image display that involves access to the local resource 107 will now be described with reference to the flowchart in FIG. 10.

The process starts when the display image generating unit 108 requests access to the local resource 107 (step S10). The resource access request processing unit 105*b* detects the access request and notifies the resource access sentry unit 105*a*.

The display image generating unit 108 checks the data received from the authentication unit 104, and generates second partial images that do not require access to the local resource 107, as shown in the display image IM1 in FIG. 8 (step S11).

When notified of the access request, the resource access sentry unit 105*a* checks the authentication status of the data retrieved from the web page in the authentication unit 104, in order to decide whether to allow access to the local resource 107 (step S12).

First the resource access sentry unit 105a checks whether authentication is still in progress (step S13). From step S13, the resource access sentry unit 105a proceeds to step S14 if authentication is not in progress (S13: No), or to step S21 if authentication is still in progress (S13: Yes).

In step S14, the resource access sentry unit 105a checks the authentication result obtained by the authentication unit 104. From step S14, the resource access sentry unit 105a proceeds to step S15 if authentication succeeded (step S14: Yes), or to step S19 if authentication failed (S14: No).

In step S15, the resource access sentry unit 105a notifies the display image generating unit 108 of successful authentication, through the resource access request processing unit 105b.

Following step S15, the resource access sentry unit 105a passes the access request from the display image generating unit 108 to the resource access control unit 106 (step S16). The resource access control unit 106 receives the access request for access to the local resource 107, and controls access to the local resource 107. The resource access sentry unit 105a receives data resulting from the access request through the resource access control unit 106, and passes the received data to the display image generating unit 108 through the resource access request processing unit 105b.

Next, the display image generating unit 108 generates one or more first partial images for the web page on the basis of both the data received from the resource access request processing unit 105b and the data retrieved from the web page itself. The display image generating unit 108 generates a display image by combining the first partial images with the second partial images generated in step S11 (step S17), and passes the generated display image to the display control unit 110.

Next, the display control unit 110 displays the display image received from the display image generating unit 108 on the display device 111 (step S18).

If authentication fails in step S14 (S14: No), the resource access sentry unit 105a proceeds to step S19 and notifies the display image generating unit 108, through the resource access request processing unit 105b, of failed authentication.

Figure 11:
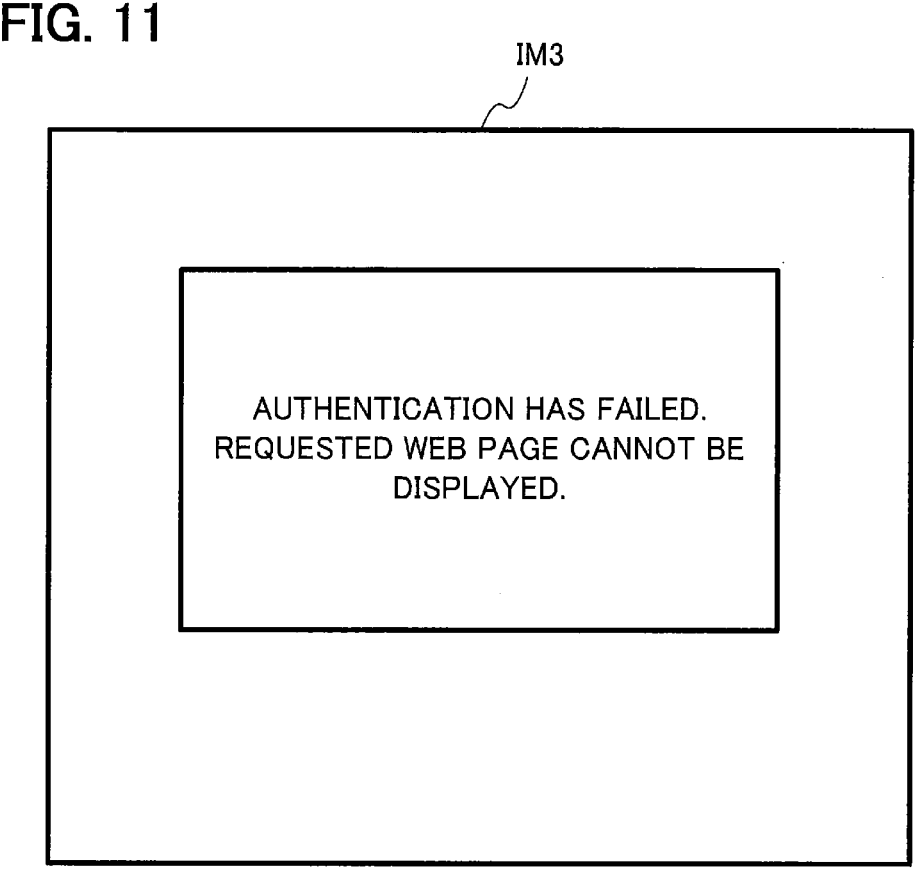
FIG. 11 schematically shows an exemplary image displayed when authentication fails for a retrieved web page and the web page cannot be displayed.

When notified of failed authentication by the resource access request processing unit 105b, the display image generating unit 108 generates a display image such as image IM3 in FIG. 11, for example, indicating that authentication has failed and the retrieved web page cannot be displayed (step S20). The display image generating unit 108 passes the generated display image to the display control unit 110, and the image is displayed in step S18.

If authentication is still in progress in step S13 (S13: Yes), the resource access sentry unit 105a proceeds to step S21. In step S21, the resource access sentry unit 105a notifies the display image generating unit 108, through the resource access request processing unit 105b, that authentication is in progress.

Figure 12:
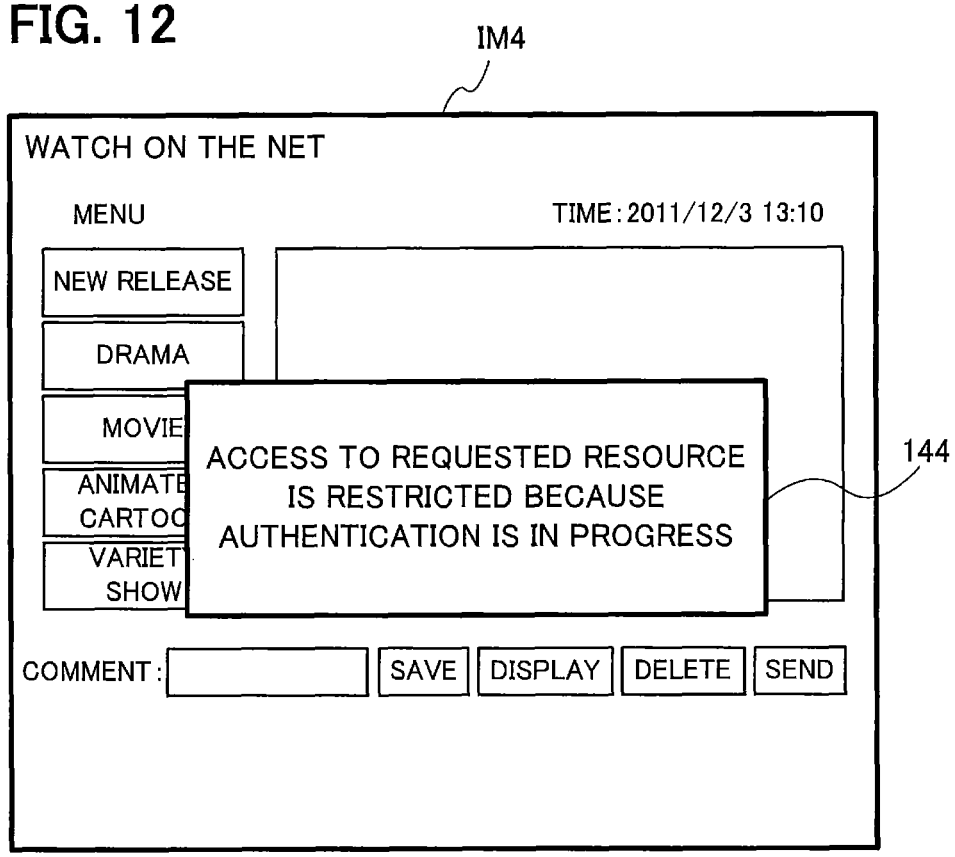
FIG. 12 schematically shows an exemplary image displayed while authentication of a retrieved web page is in progress and access to a requested resource is restricted.

When notified that authentication is in progress by the resource access request processing unit 105b, the display image generating unit 108 generates a notification image of message box 144 indicating that authentication for the retrieved web page is in progress and access to a requested local resource is restricted, as shown in FIG. 12, for example. The display image generating unit 108 generates a display image IM4 by combining the message box 144 with the second partial images generated in step S11 (step S22), and passes the generated display image IM4 to the display control unit 110.

In this embodiment, display image IM4 is generated by combining the second partial images generated in step S11 with the message box 144 indicating that access to a requested local resource is restricted in step S22, but this is not a limitation. Other embodiments may be configured so that, for example, the display image generating unit 108 passes only the second partial images generated in step S11 to the display control unit 110 as a display image.

Next, the display control unit 110 displays the display image received from the display image generating unit 108 on the display device 111 (step S23).

Next, the resource access sentry unit 105a waits for authentication to be completed and for the authentication unit 104 to send a notification of the authentication result (step S24). That is, the resource access sentry unit 105a checks whether authentication is completed (step S25), and proceeds to step S14 when authentication is completed (S25: Yes).

As described above, when the display of an image of a web page retrieved from the server 131 over the network 130 requires authentication for access to a local resource 107, even before authentication is completed, the novel image processing device 100 can display an image on the basis of part of the retrieved data, without using display elements that require access to the local resource 107. Accordingly, the user can view part of the image on the basis of the data retrieved from the web page even before authentication is completed.

When an access request for access to the local resource 107 is made, the novel image processing device 100 displays images on the screen that reflect the authentication status and result, so the user can know whether the displayed image includes all of the partial images generated from the data retrieved from the web page or includes only some of the partial images because authentication is still in progress, or whether the retrieved web page cannot be displayed because authentication has failed. The novel image processing device 100 accordingly enables an image based on retrieved data to be displayed before authentication of the retrieved data is completed, without compromising the security of the local resource 107.

In the embodiment described above, the image processing device 100 includes the display section 109, but this configuration is not a limitation; other embodiments may be configured so that, for example, instead of including the display section 109, the image processing device 100 has an interface unit for connecting with another device, and the display images generated in the display image generating unit 108 are displayed on a display unit of the other device.

Those skilled in the art will recognize that further variations are possible within the scope of the invention, which is defined in the appended claims.

What is claimed is:

1. An image processor that includes at least one computer processor for executing devices of the image processor, comprising:
    a retrieval device that retrieves a data file from a network, the data file including data for generating a plurality of partial images and generating a display image by combining the plurality of partial images, the display image to be displayed in a browser running on the image processor;
    an authentication device that authenticates the data file;
    a local resource;
    a resource access control device that controls the local resource;

a resource access supervision device for receiving authentication results and status information from the authentication device and deciding whether to allow access to the local resource; and a display image generating device that makes an access request to the resource access supervision device for access to the local resource, generating the display image according to a response to the access request from the resource access supervision device; wherein while the authentication device is authenticating the data file, the resource access supervision device disallows the access request and sends the display image generating device an authentication-in-progress notification; and when the display image generating device receives the authentication-in-progress notification, the display image generating device distinguishes between one or more first partial images requiring access to the local resource and one or more second partial images not requiring access to the local resource by analyzing the data file, generates a notification image indicating that the authentication is being performed, generates the one or more second partial images, generates the display image by combining the one or more second partial images and the notification image, and displays the display image in the browser, wherein the notification image includes a notification message to a user that the authentication process is in progress prior to completing the authentication of the data file.

2. The image processor of claim 1, wherein the notification image also indicates that access to the local resource is restricted.

3. The image processor of claim 1, wherein:

when the authentication succeeds, the resource access supervision device allows the access request, passes the access request to the resource access control device, receives an access result from the resource access control device, and passes the access result to the display image generating device; and after receiving the access result, the display image generating device generates the display image by combining the one or more first partial images and the one or more second partial images.

4. The image processor of claim 1, wherein:

when the authentication fails, the resource access supervision device disallows the access request and sends the display image generating device an authentication failure notification; and upon receiving the authentication failure notification the display image generating device generates, as the display image, an image indicating that the authentication has failed.

5. The image processor of claim 1, wherein the resource access control device refrains from controlling the local resource in response to the access request when the resource access supervision device disallows access to the local resource.

6. The image processor of claim 1, wherein the data file is a structured data file including information written in a markup language.

7. The image processor of claim 6, wherein the data file further includes a script file written in a script language for describing a program executable in the image processing device.

8. The image processor of claim 1, wherein the data file includes data for authentication based on a public key; and the authentication device authenticates the data file based on the public key.

9. An image processing method performed by utilizing an image processor that includes at least one computer processor, comprising:

retrieving a data file from a network, the data file including data for generating a plurality of partial images and generating a display image by combining the plurality of partial images, the display image to be displayed in a browser running on the image processor;

authenticating the data file;

controlling a local resource;

receiving authentication results and status information from the step of authenticating the data file and deciding whether to allow access to the local resource; and making an access request for receiving authentication results and status information for access to the local resource, generating, on a display image generating device, the display image according to a response to the access request from the step of receiving authentication results and status information; wherein while authenticating the data file is being performed, disallowing the access request and sending the display image generating device an authentication-in-progress notification; and after receiving the authentication-in-progress notification, distinguishing between one or more first partial images requiring access to the local resource and one or more second partial images not requiring access to the local resource by analyzing the data file, generating a notification image indicating that the authentication is being performed, generating the one or more second partial images, generating the display image by combining the one or more second partial images and the notification image, and displaying the display image in the browser, wherein the notification image includes a notification message to a user that the authentication process is in progress prior to completing the authentication of the data file.

* * * * *